US008648529B2

(12) United States Patent
Naganawa et al.

(10) Patent No.: US 8,648,529 B2
(45) Date of Patent: Feb. 11, 2014

(54) LIGHT-EMITTING COMPOSITION, ELECTROLUMINESCENT SHEET, AND METHOD FOR PRODUCING SAME

(75) Inventors: Satoshi Naganawa, Tokyo (JP); Yumiko Amino, Tokyo (JP); Yoshitomo Ono, Tokyo (JP)

(73) Assignee: Lintec Corporation, Tokyo (JP)

( * ) Notice: Subject to any disclaimer, the term of this patent is extended or adjusted under 35 U.S.C. 154(b) by 15 days.

(21) Appl. No.: 13/504,691

(22) PCT Filed: Oct. 19, 2010

(86) PCT No.: PCT/JP2010/068384
§ 371 (c)(1), (2), (4) Date: Jun. 18, 2012

(87) PCT Pub. No.: WO2011/052432
PCT Pub. Date: May 5, 2011

(65) Prior Publication Data
US 2012/0242220 A1 Sep. 27, 2012

(30) Foreign Application Priority Data
Oct. 29, 2009 (JP) ................................ 2009-249302

(51) Int. Cl.
*C09K 11/02* (2006.01)
*H05B 33/14* (2006.01)
*H05B 33/10* (2006.01)

(52) U.S. Cl.
USPC ............................ 313/509; 313/503; 313/504

(58) Field of Classification Search
USPC ................................. 445/24-25; 253/301.26
See application file for complete search history.

(56) References Cited

U.S. PATENT DOCUMENTS 3,421,037 A 1/1969 Dymon
2004/0227705 A1* 11/2004 Fujimoto et al. ................ 345/76
(Continued)

FOREIGN PATENT DOCUMENTS

JP 4 190586 7/1992
JP 5 47472 2/1993
(Continued)

OTHER PUBLICATIONS

International Search Report Issued Dec. 7, 2010 in PCT/JP10/68384 Filed Oct. 19, 2010.
(Continued)

*Primary Examiner* — Anh Mai
*Assistant Examiner* — Elmito Breval
(74) *Attorney, Agent, or Firm* — Oblon, Spivak, McClelland, Maier & Neustadt, L.L.P.

(57) ABSTRACT

A light-emitting composition comprising (A) a compound having a cyanoethyl group, (B) an adhesive resin material and (C) an electroluminescent material, wherein an amount of the component (B) is from 1 to 1,000 parts by mass per 100 parts by mass of the component (A); an electroluminescent sheet comprising at least a first electrode, an electroluminescent layer and a second electrode, laminated in this order, wherein at least one of the first electrode and the second electrode is transparent, and the electroluminescent layer contains the light-emitting composition; and a method for producing thereof are provided. Specifically, an electroluminescent sheet that can be produced at ambient temperature without heating, has high productivity, and can be mass produced at low cost, a method for producing thereof, and a light-emitting composition used therein are provided.

18 Claims, 1 Drawing Sheet

(56) References Cited

U.S. PATENT DOCUMENTS

| | | | | |
|---|---|---|---|---|
| 2008/0029373 | A1 * | 2/2008 | Hotta et al. | 200/314 |
| 2008/0213621 | A1 | 9/2008 | Takashima et al. | |
| 2009/0026926 | A1 * | 1/2009 | Shirata et al. | 313/504 |

FOREIGN PATENT DOCUMENTS

| | | |
|---|---|---|
| JP | 2000 100571 | 4/2000 |
| JP | 2002 43064 | 2/2002 |
| JP | 2002 329581 | 11/2002 |
| JP | 2005 227571 | 8/2005 |
| JP | 2008 269964 | 11/2008 |
| JP | 2009 223023 | 10/2009 |

OTHER PUBLICATIONS

Extended European Search Report issue for the corresponding European patent application No. 10826564.6.

* cited by examiner

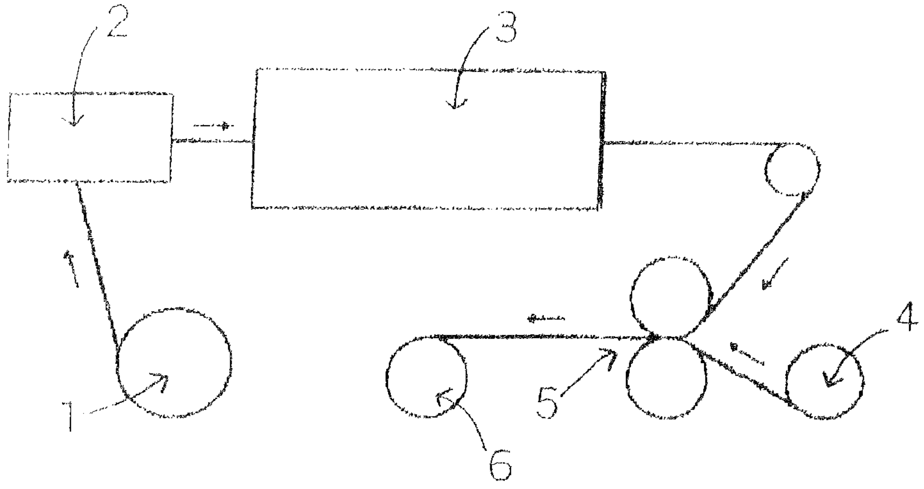
2
3
4
1
5
6

LIGHT-EMITTING COMPOSITION, ELECTROLUMINESCENT SHEET, AND METHOD FOR PRODUCING SAME

TECHNICAL FIELD

The present invention relates to a light-emitting composition, an electroluminescent sheet, and a method for producing thereof, and more particularly relates to a light-emitting composition that can be laminated onto an electrode at ambient temperature, an electroluminescent sheet comprising the light-emitting composition with high luminance and high reliability which can be mass produced at low cost and efficiently, and a method for producing thereof.

BACKGROUND ART

An electroluminescent device connected to an alternating-current source, for example, an inorganic EL device, can be formed on paper or a polymer film by a printing technique, and forms a market as an illumination device required to have flexibility. The inorganic EL device of this type is produced, for example, as disclosed in Patent Document 1, by laminating a dielectric material and a light-emitting material, each of which is dispersed in a resin binder, on an electrode by using a screen printing technique. However, an electroluminescent sheet produced by the technique has a problem that it requires a large number of process steps and thus is not suitable for mass production.

Patent Document 2 provides an electroluminescent sheet that has high luminance and high reliability by using a resin binder having a large dielectric constant in a light-emitting layer. However the resin binder has no adhesiveness at ambient temperature and is required to be adhered under heating on laminating onto an electrode, which may bring about a problem of causing not only damages on the base material and the electrode, but also considerable deterioration of the production efficiency.

In this context, there is a demand of an electroluminescent sheet that can be produced at ambient temperature without heating, has high productivity and can be mass produced at low cost, and a method for producing thereof.

RELATED ART DOCUMENTS

Patent Documents

Patent Document 1
JP-B-7-58636
Patent Document 2
JP-A-5-47472

SUMMARY OF THE INVENTION

Problems to be Solved by the Invention

The present invention is provided in order to solve the above problems. It is an object of the present invention to provide an electroluminescent sheet which can be produced at ambient temperature without heating, has high productivity and can be mass produced at low cost, a method for producing thereof, and a light-emitting composition used therein.

Means for Solving the Problems

To achieve the above object, as a result of investigation, the inventors has found that the object is achieved by using a light-emitting composition comprising a compound having a cyanoethyl group, an adhesive resin material and an electroluminescent material in predetermined amounts, and thus the present invention has been completed.

The present invention provides:

(1) a light-emitting composition comprising (A) a compound having a cyanoethyl group, (B) an adhesive resin material and (C) an electroluminescent material, wherein an amount of the component (B) is from 1 to 1,000 parts by mass per 100 parts by mass of the component (A), (2) the light-emitting composition according to (1), wherein the component (B) contains at least one selected from (a) an adhesive resin material having a glass transition temperature of −70 to 5° C. and (b) an adhesive resin material containing a rubber-like hydrocarbon elastomer and a tackifier, (3) the light-emitting composition according to (1), wherein the component (A) has a mass average molecular weight of 10,000 to 200,000, (4) the light-emitting composition according to (1), wherein an amount of the component (C) is from 0.5 to 600 parts by mass per 100 parts by mass of the total of the component (A) and the component (B), (5) the light-emitting composition according to (1), wherein the component (C) is dispersed into a mixture of the component (A) and the component (B), (6) the light-emitting composition according to (5), wherein the mixture of the component (A) and the component (B) has a relative dielectric constant of 6 or more, (7) an electroluminescent sheet comprising at least a first electrode, an electroluminescent layer and a second electrode, laminated in this order, wherein at least one of the first electrode and the second electrode is transparent, and the electroluminescent layer contains the light-emitting composition according to any one of (1) to (6), and (8) a method for producing the electroluminescent sheet according to (7), by using a coating apparatus comprising at least a unwinding roll part, a wind-up roll part, a coating part and an laminating part, comprising that any one of electrode of the first electrode and the second electrode wound-up into a roll is unwound; the unwound electrode is coated with the light-emitting composition according to (1) to (6) in the coating part so as to form the electroluminescent layer thereon; the other electrode is laminated to the electroluminescent layer to form the electroluminescent sheet, the resulting electroluminescent sheet is wound on the wind-up roll part.

Advantages of the Invention

The light-emitting composition of the present invention has adhesiveness and can be laminated to an electrode at ambient temperature, and thus an electroluminescent sheet having high luminance and high reliability which can be mass produced at low cost and efficiently.

BRIEF DESCRIPTION OF THE DRAWING

[FIG. 1]

The FIGURE is a schematic diagram showing an example of the method for producing an electroluminescent sheet according to the present invention.

EMBODIMENTS FOR CARRYING OUT THE INVENTION

The light-emitting composition of the present invention contains (A) a compound having a cyanoethyl group, (B) an adhesive resin material and (C) an electroluminescent material, wherein the amount of the component (B) is from 1 to 1,000 parts by mass, and preferably from 2 to 300 parts by mass per 100 parts by mass of the component (A).

When the amount of the component (B) is less than 1 part by mass, a light-emitting composition having adhesiveness may not be obtained and the luminance may be decreased due to emission unevenness caused by partial adhesion failure between the composition and an electrodes described below. If the amount exceeds 1,000 parts by mass, a sufficient luminance may not be obtained.

The amount of the component (C) is preferably from 0.5 to 600 parts by mass, and more preferably from 1 to 400 parts by mass per 100 parts by mass of the total of the components (A) and (B). If the amount of the component (C) is 0.5 part by mass or more, the light-emitting composition may have sufficient function (light-emitting function), and if the case of the amount is 600 parts by mass or less, sufficient adhesiveness for lamination of the electrode may be obtained.

Examples of the compound having a cyanoethyl group as the component (A) include a cyanoethylated product of polysaccharides, such as cyanoethyl cellulose, cyanoethyl pullulan and cyanoethyl starch, cyanoethylated product of a polysaccharides derivative, such as cyanoethyl hydroxyethyl cellulose and cyanoethyl glycerol pullulan, cyanoethylated product of a polyol, such as cyanoethyl polyvinyl alcohol; cyanoethylated product of a sucrose compound, and a cyanoethylated product of a sugar alcohol compound. These cyanoethylated products may be obtained, for example, in such a manner that a compound having a hydroxyl group, such as the polysaccharides, polysaccharides derivative, polyol, sucrose compound and sugar alcohol compound described above, is reacted with acrylonitrile, and thereby a part or the whole of the hydroxyl group is replaced by a substituent having a cyanoethyl group. The light-emitting composition of the present invention contains a compound having cyanoethyl group, thereby increasing the relative dielectric constant of the part of the electroluminescent layer other than the electroluminescent material, which results in increase of the luminance.

The component (A) preferably has amass average molecular weight of from 10,000 to 200,000, and more preferably from 20,000 to 150,000. When the mass average molecular weight is in the range, the compound having a cyanoethyl group may favorably function as a binder and form an electroluminescent layer having suitable flexibility.

The content of nitrogen derived from the cyanoethyl group of the compound having a cyanoethyl group (i.e., the nitrogen content) is preferably 5% by mass or more. When the nitrogen content is 5% by mass or more, the relative dielectric constant of the electroluminescent layer may be easily set to a desired value, thereby providing an electroluminescent sheet having a high luminance. It is however difficult to produce the compound having a cyanoethyl group that has a nitrogen content exceeding 20% by mass, and thus the nitrogen content is preferably from 5 to 20% by mass, and more preferably from 8 to 15% by mass. The nitrogen content may be determined by a CHN elemental analysis method.

The compound having a cyanoethyl group preferably has a softening temperature of 20 to 150° C. When the softening point is in the range, an electroluminescent layer having suitable flexibility may be obtained even though the electroluminescent material is contained therein. The softening temperature is measured according to JIS K7206.

The adhesive resin material of the component (B) is not particularly limited to as far as a resin material has adhesiveness, and is preferably at least one selected from (a) an adhesive resin material having a glass transition temperature of −70 to 5° C. and (b) an adhesive resin material containing a rubber-like hydrocarbon elastomer and a tackifier.

Examples of the component (a) include an acrylic resin such as an acrylic polymer. Preferred examples of the acrylic resin having adhesiveness include a copolymer of a (meth) acrylate ester containing alkyl group having 1 to 20 carbon atoms in ester moiety with a monomer optionally having a functional group such as a carboxyl group and an additional monomer, i.e., a (meth)acrylate ester copolymer. In the present invention, the term "(meth)acrylic acid" means both "acrylic acid" and "methacrylic acid".

Examples of the (meth)acrylate ester containing alkyl group having 1 to 20 carbon atoms in ester moiety include methyl (meth)acrylate, ethyl (meth)acrylate, propyl (meth) acrylate, butyl (meth)acrylate, pentyl (meth)acrylate, hexyl (meth)acrylate, cyclohexyl (meth)acrylate, 2-ethylhexyl (meth)acrylate, isooctyl (meth)acrylate, decyl (meth)acrylate, dodecyl (meth)acrylate, myristyl (meth)acrylate, palmityl (meth)acrylate and stearyl (meth)acrylate. These may be used alone or as a combination of two or more.

Examples of the monomer having a functional group which is optionally used, include an ethylenically unsaturated carboxylic acid such as acrylic acid, methacrylic acid, crotonic acid, maleic acid, itaconic acid and citraconic acid, a hydroxyalkyl (meth)acrylate ester such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate and 4-hydroxybutyl (meth) acrylate, and a monoalkylaminoalkyl (meth)acrylate such as monomethylaminoethyl (meth)acrylate, monoethylaminoethyl (meth)acrylate, monomethylaminopropyl (meth)acrylate and monoethylaminopropyl (meth)acrylate. These monomers may be used alone or as a combination of two or more.

Examples of the additional monomer which is optionally used, include a vinyl ester such as vinyl acetate and vinyl propionate, an olefin such as ethylene, propylene and isobutylene, a halogenated olefin such as vinyl chloride and vinylidene chloride, a styrene monomer such as styrene and α-methylstyrene, a diene monomer such as butadiene, isoprene and chloroprene, a nitrile monomer such as acrylonitrile and methacrylonitrile, and an acrylamide compound such as acrylamide, N-methylacrylamide and N,N-dimethylacrylamide. These may be used alone or as a combination of two or more.

In the case where the acrylic resin is used in the present invention, it is preferred that the (meth)acrylate ester is polymerized as a major component with at least one optionally selected from the monomer having a functional group and the additional monomer, so as to provide the glass transition temperature thereof within a range of −70 to 5° C. The mode of copolymerization is not particularly limited to, any of random, block and graft copolymers may be used. The molecular weight thereof, which is in terms of average molecular weight, is preferably 300,000 or more, and more preferably from 500,000 to 1,500,000. The mass average molecular weight of a polymer is a value which is determined by gel permeation chromatography using tetrahydrofuran as a developing solvent, and calculated in terms of polystyrene standard.

In order to maintain the adhesiveness of the acrylic resin at ambient temperature and prevent ooze thereof on bonding the electroluminescent layer to another layer, a crosslinking agent such as a polyisocyanate compound may be reacted with a functional group having active hydrogen (such as hydroxyl group and carboxyl group) in the acrylic resin. Alternetively, an internal crosslinking agent such as a multifunctional acrylate monomer may be copolymerized on polymerization. It is preferred that a glass transition temperature Tg of the acrylic resin after crosslinking is in the range of −70 to 5° C.

In the present invention, the glass transition temperature (Tg) is determined by the following measurement method 1.

Measurement Method 1

According to JIS K7121, Tg is determined by measuring the extrapolated glass transition starting temperature within a temperature range of from −80° C. to 250° C. by using a power compensated differential scanning calorimeter.

The rubber-like hydrocarbon elastomer contained in the adhesive resin material (b) is not particularly limited to, various elastomers such as a diene-based elastomer, an olefin-based elastomer and a styrene-based elastomer may be used.

Examples of the diene hydrocarbon-based elastomer include natural rubber, synthetic isoprene rubber, butadiene rubber, nitrile rubber, hydrogenated nitrile rubber and chloroprene rubber. Examples of the olefin hydrocarbon-based elastomer include polyisobutylene, polybutene, butyl rubber, an ethylene-propylene copolymer elastomer, an ethylene-1-butene copolymer elastomer, an ethylene-propylene-1-butene copolymer elastomer, an ethylene-1-hexene copolymer elastomer, an ethylene-1-octene copolymer elastomer, an ethylene-styrene copolymer elastomer, an ethylene-norbornene copolymer elastomer, a propylene-1-butene copolymer elastomer, an ethylene-propylene-unconjugated diene copolymer elastomer, an ethylene-1-butene-unconjugated diene copolymer elastomer and an ethylene-propylene-1-butene-unconjugated diene copolymer elastomer.

Examples of the styrene-based elastomer include a styrene-ethylene-propylene block copolymer, a styrene-butadiene block copolymer, a styrene-butadiene-styrene block copolymer, a styrene-isoprene block copolymer, a styrene-isoprene-styrene block copolymer, a hydrogenated styrene-butadiene block copolymer, a hydrogenated styrene-butadiene-styrene block copolymer, a hydrogenated styrene-isoprene block copolymer and a hydrogenated styrene-isoprene-styrene block copolymer. In the present invention, the rubber-like hydrocarbon elastomer may be used alone or as a combination of two or more.

Examples of the tackifier contained in the adhesive resin material (b) include a rosin resin, a rosin ester resin, a terpene resin, a terpene phenol resin, a phenol resin, a xylene resin, a coumarone resin, a coumarone indene resin, a styrene resin, an aliphatic petroleum resin, an aromatic petroleum resin, an alicyclic hydrocarbon resin, and a modified resin thereof and a hydrogenated resin thereof, but are not limited to. The tackifier may be used alone or as a combination of two or more.

In the present invention, the mixture of the component (A) and the component (B) preferably has a relative dielectric constant of 6 or more, and more preferably 6.5 to 30. When the relative dielectric constant is 6 or more, the electroluminescent sheet provides a sufficient luminance in which the component (C) is added.

In the present invention, the relative dielectric constant is determined by the following measurement method 2.

Measurement Method 2

The composition is formed into a sheet film having a thickness of 100 μm (size: 5 cm×5 cm). The capacitance (Cp) at 1 MHz is measured with an impedance analyzer and substituted into the following expression, then the relative dielectric constant (∈) is determined.

$$\in=(d\times Cp)/(\pi\times r^2\times\in^0)$$

In the expression, d represents the thickness (m), r represents the radius of electrode ($2.5\times10^{-3}$ m) and $\in^0$ represents the dielectric constant of vacuum ($8.854\times10^{-12}$).

The electroluminescent material as the component (C) is not particularly limited as far as it emits light on application of voltage, examples thereof include inorganic EL (electroluminescent) materials such as ZnS:Cu, ZnS:Mn, ZnS:$TbF_3$, ZnS:$SmF_3$, ZnS:$TmF_3$, CaS:Eu and SrS:Ce.

In addition to the components (A), (B) and (C), the light-emitting composition of the present invention may optionally contain other additives such as an anti-settling agent, an organic or inorganic fluorescent substance, an ultraviolet light absorber and an infrared absorber in such a range that does not impair the advantages of the present invention.

The light-emitting composition of the present invention may be produced by dispersive mixing of the components (A), (B) and (C) according to an conventional method, and is preferably produced in such a manner that the component (C) is kneaded and dispersed into a mixture of the component (A) and the component (B) (hereinafter, the mixture of the component (A) and the component (B) may be referred to as an adhesive composition) since good production efficiency is obtained. A solvent may be added on kneading and dispersing. As the solvent, methyl ethyl ketone and/or methyl isobutyl ketone may be used. The amount of the solvent used is preferably from 20 to 400 parts by mass per 100 parts by mass of the adhesive composition.

The electroluminescent sheet containing the light-emitting composition of the present invention comprises at least a first electrode, an electroluminescent layer and a second electrode, which are laminated in this order, wherein at least one of the first electrode and the second electrode is transparent, and the electroluminescent layer contains the light-emitting composition of the present invention.

The first electrode and the second electrode are not particularly limited as far as anyone of which is transparent, and examples thereof include a transparent electrode material, for instance a thin film of a metal oxide film such as indium tin oxide (ITO), indium oxide and tin oxide, an ultrathin film such as a noble metal thin film and an organic material such as an electro-conductive polymer, e.g., polyaniline and polythiophene, a metal foil such as Al, Cu and Ni, and a resin film mixed with an electro-conductive filler such as carbon black.

The thickness of the electroluminescent layer is generally from 0.1 to 200 μm, and preferably from 1 to 100 μm.

The electroluminescent sheet of the present invention preferably has a dielectric material layer. The dielectric material layer may be provided between the electroluminescent layer and the first electrode, or between the electroluminescent layer and the second electrode.

Examples of a material of the dielectric material layer include barium titanate, silicon oxide, silicon nitride, antimony-doped tin oxide, yttrium oxide and titanium oxide. It is preferred that the thickness of the dielectric material layer is generally from 0.1 to 50 μm.

Since the light-emitting composition of the present invention has adhesiveness, an electroluminescent sheet can be produced at ambient temperature without particularly heating, thus can be produced by using a general coating apparatus. Specifically, by using a coating apparatus which comprises at least a unwinding roll part, a wind-up roll part, a coating part and a laminating part, the electroluminescent sheet may be produced as stated below. Any one of electrode of the first electrode and the second electrode wound-up into a roll is unwound; the unwound electrode is subsequently coated with the light-emitting composition of the present invention in the coating part so as to form the electroluminescent layer thereon; then the other electrode is laminated to the electroluminescent layer to form the electroluminescent sheet. The resulting electroluminescent sheet is wound on the wind-up roll part.

More specifically, as shown in FIG. 1, following the first electrode is unwound from a first unwinding roll 1, the light-emitting composition is coated thereon in a coating part 2 and is optionally dried in a drying part 3, the second electrode is subsequently unwound from a second unwinding roll 4 and is then laminated thereto in a laminating part 5, and the electroluminescent sheet is wound on the wind-up roll 6. The coating processes of the light-emitting composition include, but not particularly limited to, die-coating and knife-coating. The drying is generally performed at 80 to 150° C. for 10 seconds to 5 minutes.

EXAMPLES

The present invention will be described in more detail with reference to examples, but the present invention is not limited to the examples unless departing from the scope of the present invention.

The measurements of physical properties and evaluations in Examples and Comparative Examples were performed in the following manners.

1. Measurement of Glass Transition Temperature (Tg)

The glass transition temperature was measured according to aforementioned Measurement Method 1 by using Pyrisl DSC, a trade name, produced by Perkin-Elmer, Inc. as an input compensated differential scanning calorimeter.

2. Measurement of Relative Dielectric Constant (A) A methyl ethyl ketone solution of a compound having a cyanoethyl group, (B) a methyl ethyl ketone solution of an adhesive composition, and a mixture of (A) a methyl ethyl ketone solution of a compound having a cyanoethyl group and (B) a methyl ethyl ketone solution of an adhesive composition (an adhesive resin material) were coated on a release film (product name:PET-3811, produced by Lintec Corporation) and dried. After the release film was removed, a sheet film having a thickness of 100 μm was formed and measured according to Measurement Method 2 described above by using 4194A, a product name, produced by HEWLETT PACKARD Company as an impedance analyzer. It is noted that drying was performed at 110° C. for 2 minutes.

3. Measurement of Mass Average Molecular Weight

The mass average molecular weight was determined by a gel permeation chromatography (GPC) method. The apparatus and conditions used are shown below.

GPC apparatus: high-speed GPC apparatus, HLC-8020GPC, produced by Tosoh Corporation Columns: "TSK guard column HXL-L", "TSK Gel G400HXL", "TSK Gel G3000HXL" and "TSK Gel G2000HXL", produced by Tosoh Corporation, connected in this order to the apparatus Mobile phase: tetrahydrofuran Column temperature: 40° C.

Flow rate: 1.0 mL/min

Detector: differential refractive index detector (produced by Tosoh Corporation)

4. Measurement of Nitrogen Content

The nitrogen content was determined by a CHN elemental analysis method by using an elemental analysis apparatus (240011 CHNS, a trade name, produced by Perkin-Elmer, Inc.)

5. Measurement of Softening Temperature

The softening temperature was measured according to A50 defined in JIS K7206.

6. Measurement of Adhesive Force

A coating liquid of the light-emitting composition was applied in a thickness of 20 μm on a polyethylene terephthalate film (PET38 T-100, a trade name, produced by Mitsubishi Plastics, Inc.) and dried (at 110° C. for 2 minutes), which was then measured for a 180° peeling adhesion according to JIS 20237 (2006).

7. Measurement of Luminance

When driven at 250 V and 1,500 Hz, the luminance was measured by using a luminance meter (LS-100, a trade name, produced by Konica Minolta Sensing, Inc.)

8. Measurement of Illuminance

When driven at 250 V and 1,500 Hz, the illuminance at a position 10 cm away from the electroluminescent surface was measured by using an incident color meter (CL-200, a trade name, produced by Konica Minolta Sensing, Inc.)

9. Evaluation of Condition of Light-emitting Surface

When driven at 250 V and 1,500 Hz, the light-emitting surface was visually evaluated for emission unevenness as below.

good: emission is uniform over the entire surface emission unevenness: unevenness or non-emitting portion found on the light-emitting surface

Example 1

To 100 parts by mass of cyanoethyl polyvinyl alcohol (CR-V, a trade name, produced by Shin-Etsu Chemical Co., Ltd., relative dielectric constant: 17.76, mass average molecular weight: 60,000, nitrogen content: 12.9% by mass, softening temperature: 30° C.) as (A) a compound having a cyanoethyl group, 11 parts by mass of an acrylate ester copolymer (copolymer with butyl acrylate/acrylic acid=80/20 (mass ratio), mass average molecular weight: 700,000, Tg=−34° C.) as the adhesive resin material (B) and 340 parts by mass of methyl ethyl ketone as a solvent were added to prepare a solution of an adhesive composition.

Then, to 100 parts by mass of the solid content of the solution of the adhesive composition, 400 parts by mass of an EL fluorescent material containing ZnS:Cu (GG25 Blue Green, a trade name, produced by Osram Sylvania, Inc.) was mixed to prepare a coating liquid of the light-emitting composition. The composition which was coated on side of ITO of a second electrode substrate (ITO/polyethylene terephthalate (80 μm), produced by Oike & Co., Ltd.) to a thickness of 55 μm (after drying) and then dried at 110° C. for 2 minutes, thereby providing a first laminated composite having an electroluminescent layer. Thereafter, the electroluminescent layer was laminated onto side of an aluminum foil (first electrode) of a first electrode substrate (aluminum foil (12 μm)/polyethylene terephthalate (50 μm), ALPET, a trade name, produced by Ajiya Alminum KK), thereby providing an electroluminescent sheet.

The results of measurement for the relative dielectric constant of the adhesive composition and the adhesion force of the light-emitting composition are shown in Table 1. For the resulting electroluminescent sheet, the results of measurement for the luminescence and the illuminance, and the condition of the light-emitting surface are also shown in Table 1.

Example 2

An electroluminescent sheet was obtained in the same manner as in Example 1 except that to 100 parts by mass of the cyanoethyl polyvinyl alcohol, 43 parts by mass of the acrylate ester copolymer as the adhesive resin material and 340 parts by mass of methyl ethyl ketone as a solvent were added to prepare a solution of an adhesive composition.

As similar to Example 1, the results of measurement of the relative dielectric constant of the adhesive composition and the adhesion force of the light-emitting composition, and the results of measurement of the luminance and the illuminance and the evaluation of the condition of the light-emitting surface of the resulting electroluminescent sheet are shown in Table 1.

Example 3

An electroluminescent sheet was obtained in the same manner as in Example 1 except that to 100 parts by mass of the cyanoethyl polyvinyl alcohol, 100 parts by mass of the acrylate ester copolymer as the adhesive resin material and 340 parts by mass of methyl ethyl ketone as a solvent were added to prepare a solution of an adhesive composition.

As similar to Example 1, the results of measurement of the relative dielectric constant of the adhesive composition and the adhesion force of the light-emitting composition, and the results of measurement of the luminance and the illuminance and the evaluation of the condition of the light-emitting surface of the resulting electroluminescent sheet are shown in Table 1.

Example 4

An electroluminescent sheet was obtained in the same manner as in Example 1 except that a copolymer of butyl acrylate/acrylic acid=90/10 (mass ratio) (mass average molecular weight: 700,000, Tg=−45° C.) was used as the adhesive resin material instead of the acrylate ester copolymer used in Example 1.

As similar to Example 1, the results of measurement of the relative dielectric constant of the adhesive composition and the adhesion force of the light-emitting composition, and the results of measurement of the luminance and the illuminance and the evaluation of the condition of the light-emitting surface of the resulting electroluminescent sheet are shown in Table 1.

Example 5

An electroluminescent sheet was obtained in the same manner as in Example 1 except that a copolymer of butyl acrylate/2-hydroxyethyl acrylate=95/5 (mass ratio) (mass average molecular weight: 710,000, Tg=−52° C.) was used as the adhesive resin material instead of the acrylate ester copolymer used in Example 1.

As similar to Example 1, the results of measurement of the relative dielectric constant of the adhesive composition and the adhesion force of the light-emitting composition, and the results of measurement of the luminance and the illuminance and the evaluation of the condition of the light-emitting surface of the resulting electroluminescent sheet are shown in Table 1.

Example 6

An electroluminescent sheet was obtained in the same manner as in Example 1 except that a copolymer of 2-ethylhexyl acrylate/ethyl acrylate/vinyl acetate/acrylamide=56/27/17/2 (mass average molecular weight: 700,000, Tg=−56° C.) was used as the adhesive resin material instead of the acrylate ester copolymer used in Example 1.

As similar to Example 1, the results of measurement of the relative dielectric constant of the adhesive composition and the adhesion force of the light-emitting composition, and the results of measurement of the luminance and the illuminance and the evaluation of the condition of the light-emitting surface of the resulting electroluminescent sheet are shown in Table 1.

Example 7

An electroluminescent sheet was obtained in the same manner as in Example 1 except that cyanoethyl hydroxyethyl cellulose (CR-E, produced by Shin-Etsu Chemical Co., Ltd., relative dielectric constant: 17.10, mass average molecular weight: 110,000, nitrogen content: 12.4% by mass, softening temperature: 55° C.) was used instead of the cyanoethyl polyvinyl alcohol.

As similar to Example 1, the results of measurement of the relative dielectric constant of the adhesive composition and the adhesion force of the light-emitting composition, and the results of measurement of the luminance and the illuminance and the evaluation of the condition of the light-emitting surface of the resulting electroluminescent sheet are shown in Table 1.

Example 8

An electroluminescent sheet was obtained in the same manner as in Example 1 except that cyanoethyl pullulan (CR-S, produced by Shin-Etsu Chemical Co., Ltd., relative dielectric constant: 17.25, mass average molecular weight: 49,000, nitrogen content: 10.0% by mass, softening temperature: 95° C.) was used instead of the cyanoethyl polyvinyl alcohol.

As similar to Example 1, the results of measurement of the relative dielectric constant of the adhesive composition and the adhesion force of the light-emitting composition, and the results of measurement of the luminance and the illuminance and the evaluation of the condition of the light-emitting surface of the resulting electroluminescent sheet are shown in Table 1.

Example 9

An electroluminescent sheet was obtained in the same manner as in Example 1 except that a mixture of 50 parts by mass of a styrene-ethylene-propylene block copolymer (Septon 2043, a trade name, produced by Kuraray Co., Ltd.) as the rubber-like hydrocarbon elastomer and 50 parts by mass of a terpene phenol resin (YS Polyster 2115, a trade name, produced by Yasuhara Chemical Co., Ltd.) as the tackifier was used as the adhesive resin material instead of the acrylate ester copolymer.

As similar to Example 1, the results of measurement of the relative dielectric constant of the adhesive composition and the adhesion force of the light-emitting composition, and the results of measurement of the luminance and the illuminance and the evaluation of the condition of the light-emitting surface of the resulting electroluminescent sheet are shown in Table 1.

Example 10

An electroluminescent sheet was obtained in the same manner as in Example 1 except that a mixture of 100 parts by mass of a polybutene-polyisobutene resin (Evertack SA400E, a trade name, produced by JX Nippon Oil & Energy Corporation) as the rubber-like hydrocarbon elastomer and 50 parts by mass of a tackifier (a hydrogenated petroleum resin, Arkon P-125, a trade name, produced by Arakawa Chemical Industries, Ltd.) was used as the pressure-sensitive adhesive resin material instead of the acrylate ester copolymer.

As similar to Example 1, the results of measurement of the relative dielectric constant of the adhesive composition and the adhesion force of the light-emitting composition, and the results of measurement of the luminance and the illuminance and the evaluation of the condition of the light-emitting surface of the resulting electroluminescent sheet are shown in Table 1.

Example 11

By using the coating apparatus shown in FIG. 1, the light-emitting composition produced in Example 1 was coated on side of ITO of a unwound second electrode substrate (ITO/polyethylene terephthalate (80 μm), produced by Oike & Co., Ltd) to a thickness of 55 μm (after drying) and then dried (110° C. for 2 minutes) to form an electroluminescent layer. Then, at an the laminating part, the electroluminescent layer was laminated onto side of an aluminum foil of a first electrode substrate (aluminum foil (12 μm)/polyethylene terephthalate (50 μm), ALPET, a trade name, produced by Ajiya Alminum KK) to provide an electroluminescent sheet.

As similar to Example 1, the results of measurement of the relative dielectric constant of the adhesive composition and the adhesion force of the light-emitting composition, and the results of measurement of the luminance and the illuminance and the evaluation of the condition of the light-emitting surface of the resulting electroluminescent sheet are shown in Table 1.

Comparative Example 1

An electroluminescent sheet was obtained in the same manner as in Example 1 except that 100 parts by mass of cyanoethyl polyvinyl alcohol (CR-V, a trade name, produced by Shin-Etsu Chemical Co., Ltd., described above), 340 parts by mass of methyl ethyl ketone as a solvent, and 400 parts by mass of an EL fluorescent material containing ZnS:Cu (GG25 Blue Green, a trade name, produced by Osram Sylvania, Inc.) were mixed to prepare a light-emitting composition containing no adhesive resin material.

As similar to Example 1, the results of measurement of the relative dielectric constant of the adhesive composition and the adhesion force of the light-emitting composition, and the results of measurement of the luminance and the illuminance and the evaluation of the condition of the light-emitting surface of the resulting electroluminescent sheet are shown in Table 1.

Comparative Example 2

An electroluminescent sheet was obtained in the same manner as in Example 1 except that only the acrylate ester copolymer and 340 parts by mass of methyl ethyl ketone as a solvent were used an adhesive composition solution, but the compound having a cyanoethyl group was not used.

As similar to Example 1, the results of measurement of the relative dielectric constant of the adhesive composition and the adhesion force of the light-emitting composition, and the results of measurement of the luminance and the illuminance and the evaluation of the condition of the light-emitting surface of the resulting electroluminescent sheet are shown in Table 1.

TABLE 1

| | Relative dielectric constant of adhesive composition | Adhesion force of light-emitting composition (N/25 mm) | Luminance (cd/m$^2$) | Illuminance (lx) | Condition of light-emitting surface |
|---|---|---|---|---|---|
| Example 1 | 13.37 | 1.2 | 392.9 | 1,185.1 | good |
| Example 2 | 9.50 | 3.4 | 306.0 | 910.0 | good |
| Example 3 | 6.54 | 8.9 | 271.2 | 843.1 | good |
| Example 4 | 13.11 | 1.2 | 388.2 | 1,179.2 | good |
| Example 5 | 12.97 | 1.1 | 381.2 | 1,122.0 | good |
| Example 6 | 13.21 | 1.2 | 391.5 | 1,231.5 | good |
| Example 7 | 12.99 | 1.2 | 390.4 | 1,210.1 | good |
| Example 8 | 12.11 | 1.1 | 380.1 | 1,190.3 | good |
| Example 9 | 13.11 | 1.1 | 390.1 | 1,185.1 | good |
| Example 10 | 13.17 | 1.1 | 391.5 | 1,185.0 | good |
| Example 11 | 13.37 | 1.2 | 393.0 | 1,188.4 | good |
| Comparative Example 1 | 17.76 | 0.0 | 270.5 | 810.0 | unevenness on emitting surface |
| Comparative Example 2 | 4.26 | 23.5 | 91.6 | 269.2 | good |

The relative dielectric constant in Comparative Example 1 is the relative dielectric constant of the compound having a cyanoethyl group (cyanoethyl vinyl alcohol).

The relative dielectric constant in Comparative Example is the relative dielectric constant of the adhesive composition (acrylate ester copolymer).

As shown in Table 1, the electroluminescent sheets of Examples 1 to 11 had high luminance, which resulted in high illuminance, and had good condition of the light-emitting surface. On the other hand, the electroluminescent sheet of Comparative Example 1 containing no adhesive resin material exhibited unevenness on the light-emitting surface and had low luminance and illuminance, and the electroluminescent sheet of Comparative Example 2 containing no compound having a cyanoethyl group had low luminance.

Industrial Applicability

As described above, since the light-emitting composition of the present invention has adhesiveness and can be laminated onto an electrode at ambient temperature, it is possible to provide an electroluminescent sheet with high luminescence and reliability, which enables to produce efficiently on a large scale at a low cost.

Accordingly, it is considerably useful as practical light-emitting composition and electroluminescent sheet suitable for producing inorganic EL devices and the like.

| Reference Signs List | |
|---|---|
| 1 | first unwinding roll |
| 2 | coating part |
| 3 | drying part |
| 4 | second unwinding roll |
| 5 | laminating part |
| 6 | wind-up roll |

The invention claimed is:

1. A light-emitting composition, comprising:

(A) a compound comprising a cyanoethyl group;

(B) an adhesive resin material; and (C) an electroluminescent material, wherein an amount of the component (B) is from 1 to 1,000 parts by mass per 100 parts by mass of the component (A).

2. The composition of claim 1, wherein the component (B) comprises at least one selected from the group consisting of (a) an adhesive resin material having a glass transition temperature of from −70 to 5° C. and (b) an adhesive resin material comprising a hydrocarbon elastomer and a tackifier.

3. The composition of claim 2, wherein the hydrocarbon elastomer comprises at least one selected from the group consisting of a diene elastomer, an olefin elastomer, and a styrene elastomer.

4. The composition of claim 1, wherein the component (A) has a mass average molecular weight of 10,000 to 200,000.

5. The composition to of claim 1, wherein an amount of the component (C) is from 0.5 to 600 parts by mass per 100 parts by mass of a total of the component (A) and the component (B).

6. The composition of claim 1, wherein the component (C) is dispersed into a mixture of the component (A) and the component (B).

7. The composition of claim 6, wherein the mixture of the component (A) and the component (B) has a relative dielectric constant in a range from 6.5 to 30.

8. The composition of claim 6, wherein the mixture of the component (A) and the component (B) has a relative dielectric constant of 6 or more.

9. An electroluminescent sheet, comprising, as a laminate in the following order:

a first electrode;

an electroluminescent layer; and a second electrode, wherein at least one selected from the group consisting of the first electrode and the second electrode is transparent, and wherein the electroluminescent layer comprises the light-emitting composition of claim 1.

10. A method for producing the electroluminescent sheet, to claim 9, the method comprising:

unwinding a wound-up roll of the first electrode or the second electrode with a coating apparatus comprising an unwinding roll part, a wind-up roll part, a coating part, and an laminating part, to obtain an unwound electrode;

coating the unwound electrode with the light-emitting composition in the coating part of the coating apparatus, to form the electroluminescent layer on the unwound electrode;

laminating the remaining electrode to the electroluminescent layer in the laminating part of the coating apparatus, to form the electroluminescent sheet; and winding the electroluminescent sheet on the wind-up roll part of the coating apparatus.

11. The electroluminescent sheet of claim 9, wherein the electroluminescent layer has a thickness from 0.1 to 200 μm.

12. The electroluminescent sheet of claim 11, wherein the electroluminescent layer has a thickness from 1 to 100 μm.

13. The electroluminescent sheet of claim 9, further comprising:

a dielectric layer between the electroluminescent layer and either the first electrode or the second electrode.

14. The electroluminescent sheet of claim 13, wherein the dielectric layer has a thickness from 0.1 to 50 μm.

15. The composition of claim 1, wherein the amount of the component (B) is from 2 to 300 parts by mass per 100 parts by mass of the component (A).

16. The composition of claim 1, wherein an amount of the component (C) is from 1 to 400 parts by mass per 100 parts by mass of a total of the component (A) and the component (B).

17. The composition of claim 1, wherein the component (A) has a mass average molecular weight of 20,000 to 150, 000.

18. The composition of claim 1, wherein the compound comprising the cyanoethyl group has a softening temperature of 20 to 150°.

* * * * *